No. 856,873. PATENTED JUNE 11, 1907.
W. G. HORTON.
PHONOGRAPH ATTACHMENT.
APPLICATION FILED NOV. 12, 1906.
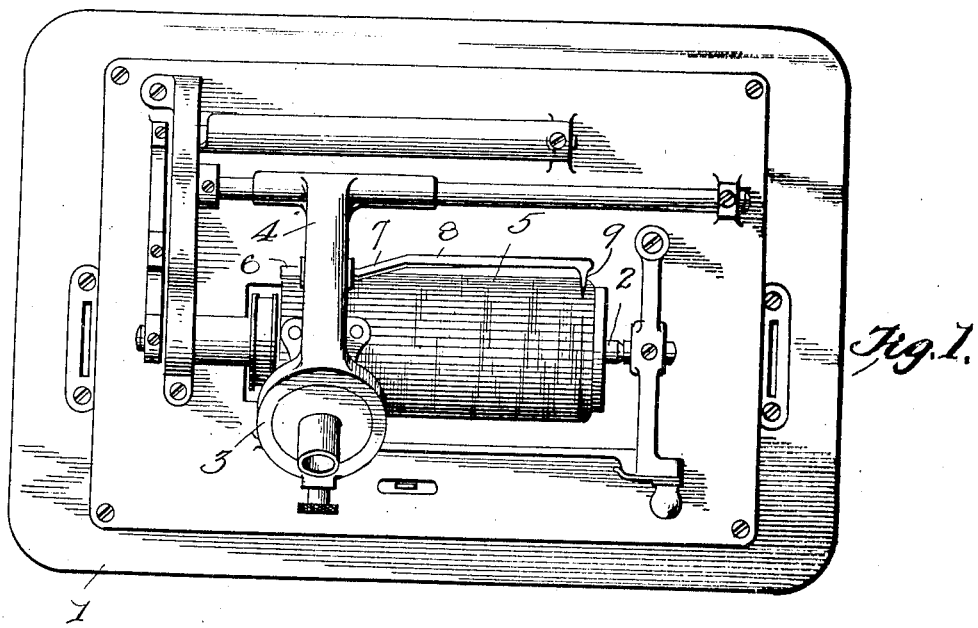
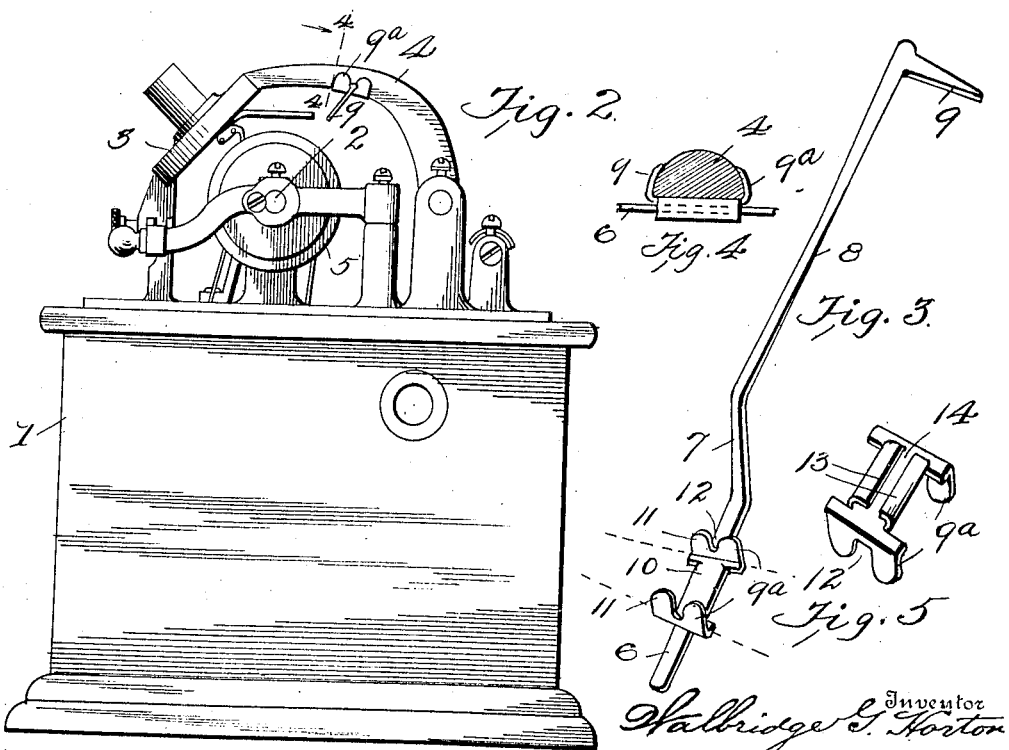

UNITED STATES PATENT OFFICE.

WALBRIDGE G. HORTON, OF BRATTLEBORO, VERMONT.

PHONOGRAPH ATTACHMENT.

No. 856,873.  Specification of Letters Patent.  Patented June 11, 1907.

Application filed November 12, 1906. Serial No. 343,003.

*To all whom it may concern:*

Be it known that I, WALBRIDGE G. HORTON, a citizen of the United States, residing at Brattleboro, in the county of Windham and State of Vermont, have invented certain new and useful Improvements in Phonograph Attachments, of which the following is a specification.

My invention relates to improvements in phonograph attachments, and has particular reference to a device for attachment to the ordinary and well known type of cylinder-record talking machine; the object of my invention, being first to provide a device or more properly a gage, by means of which the operator of the machine may readily determine the proper point at which to place the reproducer needle upon the record so that the proper reproduction of the entire record is always assured, including the announcement at the beginning of the record; second to provide such an attachment which may be quickly and easily applied to or detached from any of the well known and standard type of talking machines; and third, to provide a gage attachment which is adjustable to suit different conditions, and which will be compact and out of the way and will not interfere in any way with the working of the machine.

Further objects of the invention are to provide a device of the character set forth which will accomplish all the objects above disclosed in a thoroughly practical and efficient manner.

To attain the desired objects, my invention comprises a gage member adapted to be secured upon one of the moving parts of a talking machine, the said gage member serving to indicate the proper point at which the reproducer should be caused to engage the record to be reproduced, and the invention further consists in certain other novel features of construction and combination of parts, substantially as herein set forth.

Attention is invited to the accompanying drawings, in which:

Figure 1, is a top plan view of a talking machine having my improvements applied thereto. Fig. 2, is an end elevation of the same. Fig. 3, is a detailed perspective view of the attachment removed from the machine. Fig. 4, is a sectional view of the reproducer arm taken on line 4—4 of Fig. 2, with the gage support in position thereon, and, Fig. 5, is a detail perspective view of the clasp or means for supporting the gage finger.

In the talking machines ordinarily in use, there is no way of determining the place at which the record commences upon the cylinder or recording agent, except by observing the serrations or grooves in the cylinder, and as at best, this is mere guess-work, I have produced a device which forms a gage by means of which the record may be reproduced from the beginning, so that none of the parts of the record are lost to the listener.

In the accompanying drawings, I have shown my improvements as applied to a talking machine of a well known type, and embodying broadly, a case 1, inclosing the motor mechanism, a mandrel 2, mounted upon the case and rotated from the motor mechanism, a reproducer 3, supported above the mandrel upon the reproducer arm 4, and a cylindrical record or tablet 5, is shown in position upon the mandrel ready for reproduction. My invention resides in a finger or pointer, and a clasp which is mounted upon the reproducer arm and adjustably supports the pointer. The pointer comprises a straight shank portion 6, having substantially parallel sides, said shank portion terminating in an offset portion 7, which is bent upwardly at an angle or incline from the shank, and thence continued laterally as at 8, on a plane parallel to the shank, and on the end of said shank, is formed a substantially right-angled point or finger 9. The body 8 of the lateral portion is bent or twisted for practically its entire length as shown in Fig. 3, so that the finger on the end thereof is directed downwardly or toward the plane of the shank of the pointer, or the finger may be bent itself so that it is directed downwardly. The entire pointer is preferably made of sheet metal in one continuous piece, but of course it may be made otherwise if so desired.

The support for the pointer comprises a clasp adapted for engagement with the reproducer arm of the machine and having a guideway to support the shank of the pointer. This support consists of a pair of angular jaws 9ª, connected by a straight bar or base 10, the upper ends of the jaws converging or inclined inwardly at 11, and preferably of tapered form as shown. These jaws are of some springy material and are provided intermediate their length with a recessed or cut-away portion 12, to add greater resiliency.

The edges 13 of the base of the clasp are bent under and toward each other to form a guideway 14, to receive the shank of the pointer. The jaws are arranged on converging lines as shown in Figs. 3 and 5, to receive the reproducer arm which is usually tapering in length. As I have stated, this support for the pointer is preferably made of springy or elastic material, and may readily be stamped from one continuous piece and bent to the proper shape.

The manner in which the support is applied to the reproducer arm is clearly shown in Figs. 1, 2 and 4, the converging jaws having clamping engagement with the sides of the reproducer arm which is tapering in length and substantially semi-circular in cross section. The shank of the pointer is clamped in the guide-way of the support by means of the in-turned edges of the base of the support, and being thus frictionally engaged, it may be adjusted longitudinally in said support.

In applying my improvements to a talking machine, the support carrying the pointer, is attached to the reproducer arm, and by trial, it is ascertained at what point the reproducer should be caused to engage the record, and when such starting point is determined, the pointer is adjusted longitudinally until the indicating finger thereon is in alinement with the end of the record, as plainly shown in Fig. 1. After this adjustment, all future records may be started with certainty at the proper place, by moving the reproducer and thereby the pointer until the pointer alines with the end of the record. By the use of my attachment, the records are protected against a great deal of the misuse now commonly experienced, since the reproducer may be dropped upon the record at the proper point so as not to scratch or scar the same, and records therefore will last much longer and be more serviceable.

From the foregoing description taken in connection with the drawings, the application of my invention will be readily understood and its many advantages appreciated, it being evident that I have accomplished all the objects aimed at, and have produced a simple, practical and inexpensive attachment which will form a valuable adjunct to all talking or sound reproducing machines.

I claim:

1. A phonograph attachment comprising a clasp adapted to be mounted upon the reproducer arm of the machine, said clasp provided with a guide way, and a pointer adjustably engaged in said guide way.

2. The combination with a phonograph, of a clamp removably secured to the reproducer arm thereof, and a pointer adjustably held in said clamp and extending parallel to the record of the machine.

3. The combination with a phonograph, of a clamp having wedge engagement with the reproducer arm thereof, and a pointer secured in said clamp.

4. The combination with a phonogragh, of a clamp having wedge engagement with the reproducer arm thereof, guideways formed on the clamp, and a pointer frictionally held in said guideways.

5. The combination with a clamp having inward inclined edges, and oppositely disposed inturned edges forming guideways on the back thereof, of a pointer adjustably held in said guideways.

6. In combination with a phonograph, an arm connected to the reproducer arm of the machine arranged horizontal and parallel with the record cylinder and having a pointer or indicator at its free end.

7. The combination with a talking machine, of a pointer adjustably secured to the reproducer mechanism thereof, said pointer having an angularly-deflected pointing finger on the free end thereof.

In testimony whereof I affix my signature in presence of two witnesses.

WALBRIDGE G. HORTON.

Witnesses:
 A. F. SCHWENK,
 EDITH S. FARR.